(12) United States Patent
Chykeyuk et al.

(10) Patent No.: US 11,770,045 B2
(45) Date of Patent: Sep. 26, 2023

(54) ROTARY CONNECTOR MODULE FOR DEVICE FORMING QUASI THREE-DIMENTIONAL IMAGE

(71) Applicants: Kiryl Nikolaevich Chykeyuk, Minsk (BY); Dzmitry Leonidovich Malinouski, Minsk (BY); Dzmitry Valeryianovich Sukharebrau, Minsk (BY)

(72) Inventors: Kiryl Nikolaevich Chykeyuk, Minsk (BY); Dzmitry Leonidovich Malinouski, Minsk (BY); Dzmitry Valeryianovich Sukharebrau, Minsk (BY)

( * ) Notice: Subject to any disclaimer, the term of this patent is extended or adjusted under 35 U.S.C. 154(b) by 526 days.

(21) Appl. No.: 17/142,452

(22) Filed: Jan. 6, 2021

(65) Prior Publication Data

US 2021/0211014 A1 Jul. 8, 2021

Related U.S. Application Data

(60) Provisional application No. 62/957,509, filed on Jan. 6, 2020, provisional application No. 62/957,534, filed on Jan. 6, 2020.

(51) Int. Cl.
| | |
|---|---|
| *H01F 21/02* | (2006.01) |
| *H02K 5/22* | (2006.01) |
| *H01F 21/00* | (2006.01) |
| *G02B 30/54* | (2020.01) |
| *H01F 38/18* | (2006.01) |
| *G02B 27/01* | (2006.01) |

(52) U.S. Cl.
CPC .............. *H02K 5/225* (2013.01); *G02B 30/54* (2020.01); *H01F 21/005* (2013.01); *H01F 21/02* (2013.01); *H01F 38/18* (2013.01); *G02B 27/0172* (2013.01); *G02B 2027/0174* (2013.01)

(58) Field of Classification Search
CPC ................ H02K 5/225; H01R 13/6691; G02B 2027/0174
See application file for complete search history.

(56) References Cited

U.S. PATENT DOCUMENTS

| | | | |
|---|---|---|---|
| 9,479,032 B2 * | 10/2016 | Kato | ................ H02K 11/05 |
| 9,667,124 B2 * | 5/2017 | Utsumi | .............. H02K 15/0006 |
| 10,895,693 B2 * | 1/2021 | Autenzeller | ......... G02B 6/3604 |

(Continued)

FOREIGN PATENT DOCUMENTS

CN 109565206 A * 4/2019 ......... H01R 13/5205

*Primary Examiner* — Hai V Nguyen
(74) *Attorney, Agent, or Firm* — Nadya Reingand

(57) ABSTRACT

A rotary connector module for displays has at least one stem and rotor parts. A rotary rotation system containing a stator part base is disposed atop a winding and a magnetic system of the rotor part, the magnetic system disposed above or outside of primary and secondary winding members. An electrical power transmitter carries wireless electrical power from stem to rotor part, with the diameter of each stem or rotor part smaller than the diameter of the magnetic system. A wireless transmission system contains a hollow shaft disposed in the at least one rotor part, an at least one signal transmitter disposed on the at least one stator part, and an at least one signal receiver disposed on the at least one rotor part, with the signal receiver at the end of and below a base of the hollow shaft.

15 Claims, 6 Drawing Sheets

(56) References Cited

U.S. PATENT DOCUMENTS

| | | | |
|---|---|---|---|
| 11,695,450 B2* | 7/2023 | Blaser | H04B 5/0037 |
| | | | 307/104 |
| 2002/0132589 A1* | 9/2002 | Kojima | B60R 16/027 |
| | | | 455/73 |
| 2009/0136175 A1* | 5/2009 | Koitabashi | G02B 6/3604 |
| | | | 385/18 |
| 2013/0187497 A1* | 7/2013 | Kato | H02K 5/225 |
| | | | 310/71 |
| 2014/0091682 A1* | 4/2014 | Utsumi | H02K 15/0006 |
| | | | 310/68 B |
| 2014/0183993 A1* | 7/2014 | Takasaki | H02K 15/0062 |
| | | | 310/71 |
| 2015/0188395 A1* | 7/2015 | Fujita | H02K 5/225 |
| | | | 310/71 |
| 2015/0229172 A1* | 8/2015 | Kashihara | H02K 5/225 |
| | | | 310/71 |
| 2017/0126101 A1* | 5/2017 | Shimano | H02K 5/225 |
| 2017/0148652 A1* | 5/2017 | Hipp | H01L 21/68785 |
| 2017/0170879 A1* | 6/2017 | Weaver | H01R 39/12 |
| 2019/0179028 A1* | 6/2019 | Pacala | G01S 7/4813 |
| 2019/0222103 A1* | 7/2019 | Nedrehagen | H02K 16/00 |
| 2019/0247050 A1* | 8/2019 | Goldsmith | A61F 2/82 |
| 2019/0353849 A1* | 11/2019 | Autenzeller | G02B 6/3604 |
| 2021/0188066 A1* | 6/2021 | McGrew | B60K 17/08 |
| 2021/0188075 A1* | 6/2021 | Mock | B60W 10/08 |
| 2021/0210270 A1* | 7/2021 | Chykeyuk | H01F 21/02 |

* cited by examiner

ROTARY CONNECTOR MODULE FOR DEVICE FORMING QUASI THREE-DIMENTIONAL IMAGE

CROSS-REFERENCE TO RELATED APPLICATIONS

The present patent application claims priority to U.S. provisional application No. 62/957,534 filed on Jan. 6, 2020 and U.S. provisional application 62/957,509 filed on Jan. 6, 2020.

FIELD OF THE INVENTION

The inventive concept relates generally to a rotary connector module for display assemblies. The inventive concept further refers to embedding a module for devices and displays for transmitting electricity to the rotating part of an electrical and mechanical power system with an optical or other communications channel.

BACKGROUND

A device forming a quasi three-dimensional (3D) image in the air is a holographic display assembly that is imaged by the rotation of fan blades on which are disposed LED lights. An observer sees the image as a 3D image though, in fact, the image is flat, that's why it is called quasi 3D image. A class of optical electronic connectors (rotary link connectors) includes an optical electronic connector device for transmitting electricity and data at high speed while providing a constant circular rotation between a stationary part (stator part) and a rotating part (rotor part). For the transmission process, a rotary link connector uses optical transmission technology to send a signal in the form of a parallel light beam or laser to a rotating part. When using lasers to power technology for light radiation, it is possible for transmission to not only be stable but also to transfer up to 1.5 gigabytes per second. The biggest advantage of using optical transmission for rotary link connectors is the lack of directly connected parts through which to eliminate noise and friction. The main drawback of known solutions is parasitic heating elements of the design, caused by locating magnetic elements of the rotor and elements that provide wireless data transmission. Therefore, there is a need for an improved solution for transmitting electricity and data in display devices.

SUMMARY OF THE INVENTION

To implement the disclosed design and eliminate existing shortcomings, a new constructive implementation of a rotary connector module for a display.

The display is important for associated devices to provide greater transparency of a quasi 3D image, which is achieved by the assembly of the disclosed rotary connector module, namely, its minimal diameter. The smaller the rotary connector module is, the greater the transparency. The durability of the one or more display assemblies is attained by the greater distance between a first bearing and a second bearing of the rotary connector module. The greater the distance between the first and second bearings, the lesser the value of radial beats, which affects the life of the bearings. The greater the stability of the image, meaning the lower the value of radial beats, the better the image appears. There is less deviation of the center of the image from the axis of rotary connector module rotation than if the radial beats are higher.

The inventive concept has a rotary connector module for a display device that has a unit for rotation of a rotor part. The rotary connector module has a wireless electrical power transmitting unit for power transmitting from a stator part to the rotor part. The rotary connector module has an internal diameter of elements related to the stator or the rotor parts that are related to wireless power transmitting being less than a diameter formed by a magnetic system of the rotor part. The wireless data transmission unit has a hollow shaft located in the rotor part, at least one signal transmitter located on the stator part, and at least one signal receiver located on the rotor part, wherein the signal receiver is positioned at an end of the hollow shaft below the wireless electrical power transmitting unit.

In one embodiment of the rotary connector module, the data transmission is selected from optical transmission, capacitive data transmission, inductive data transmission, or radio communication.

In one embodiment of the rotary connector module, the unit for rotation of the rotor part includes a base of the stator part, in which a winding and a magnetic system of the rotor part are located at an upper end of the base of the stator part, and the magnetic system is located on an outside portion of the winding.

In one embodiment of the rotary connector module, the unit for rotation of the rotor part includes a base of the stator part, in which a winding and a magnetic system of the rotor part are located at an upper end of the base of the stator part, and the magnetic system is located above the winding.

In one embodiment of the rotary connector module, the receiver and transmitter of the wireless data transmission unit are located on an axis of rotation of the rotor part.

One embodiment of the rotary connector module further includes at least one blade attached to the hollow shaft, a plurality of light emitting diodes (LEDs) being attached to the blade. This embodiment may further include the plurality of LEDs as a linear array of LEDs. This embodiment may further include a control unit that controls designated times and spaces of the LEDs turning on and off. In this embodiment, the LEDs are a part of a display forming an image. The rotation frequency of the at least one blade may exceed 500 RPM, thus adapted to create an image that an observer sees as an image hanging in the air.

In one embodiment of the rotary connector module the transmitter is above the unit for rotation of the rotor part. In this embodiment, the data transmission may be a radio transmission and an antenna may be located inside the hollow shaft.

One embodiment of the rotary connector module further has a control unit for controlling a power of the wireless transmission. The control unit offers digital control of the inventive concept.

In one embodiment of the rotary connector module, the LEDs are RGB types of LEDs, and the image is form by red, green, and blue light of different intensity LEDs.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
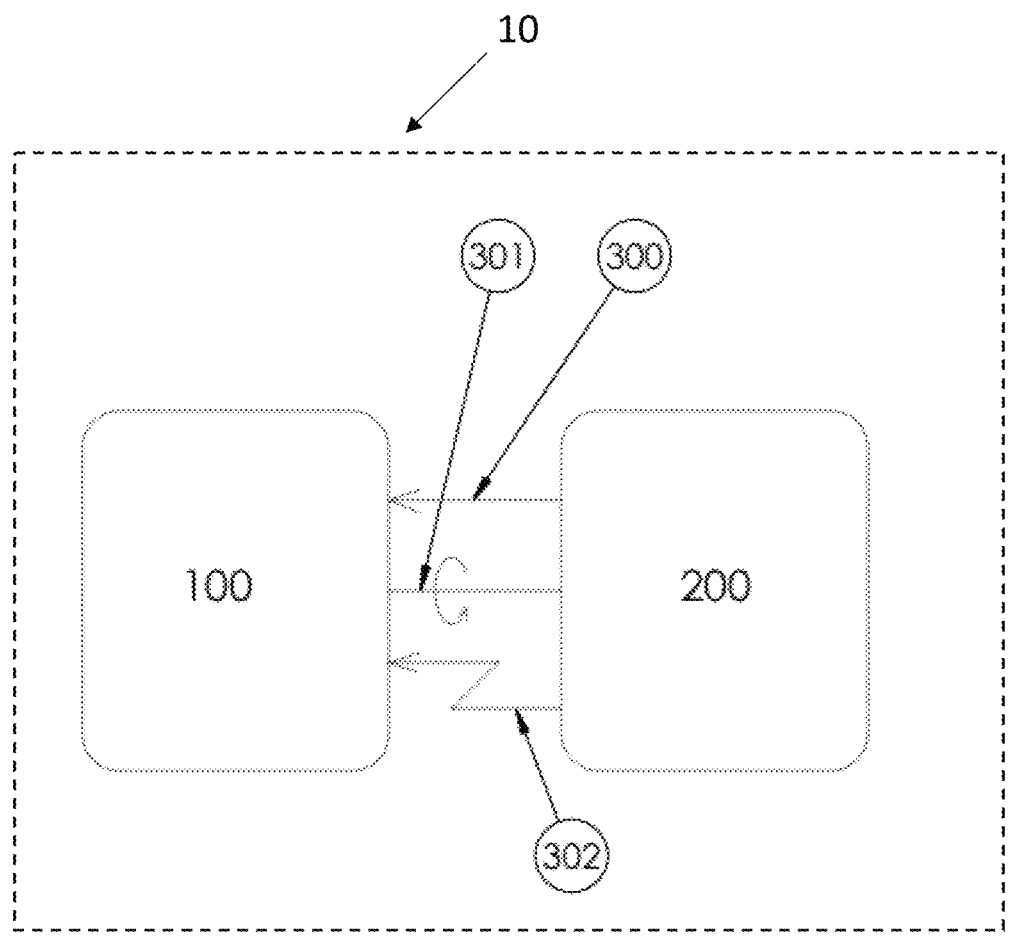
FIG. 1 illustrates a rotary connector module schematic.

Referring to the figures, FIG. 1 illustrates a rotary connector module 10 that has an at least one rotor part 100 and an at least one stator part 200. The rotary connector module 10 provides simultaneous transmission of communication types, such as an optical communication channel 300, which receives data from the at least one stator part 200 to the at least one rotor part 100 and vice versa, a mechanical communication member 301 that rotates the at least one rotor part 100 of the rotary connector module 10. A wireless electrical power transmitting unit 302 provides a wireless data transmission from the at least one stator part 200 to the at least one rotor part 100.

Figure 2:
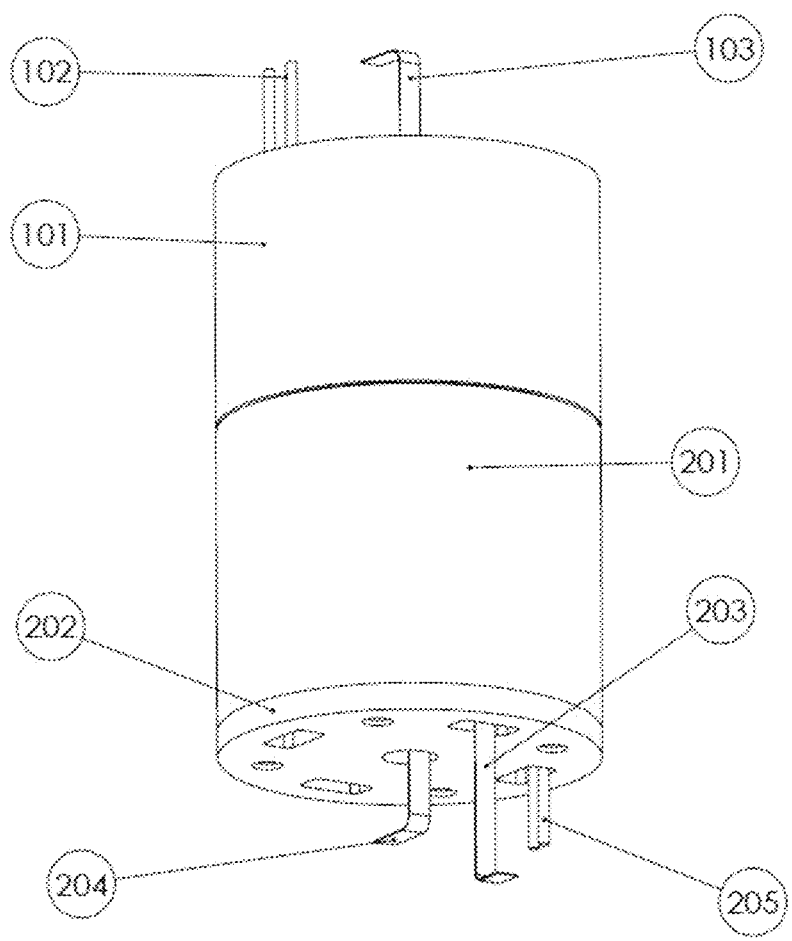
FIG. 2 illustrates a perspective view of the rotary connector module.
Figure 3A:
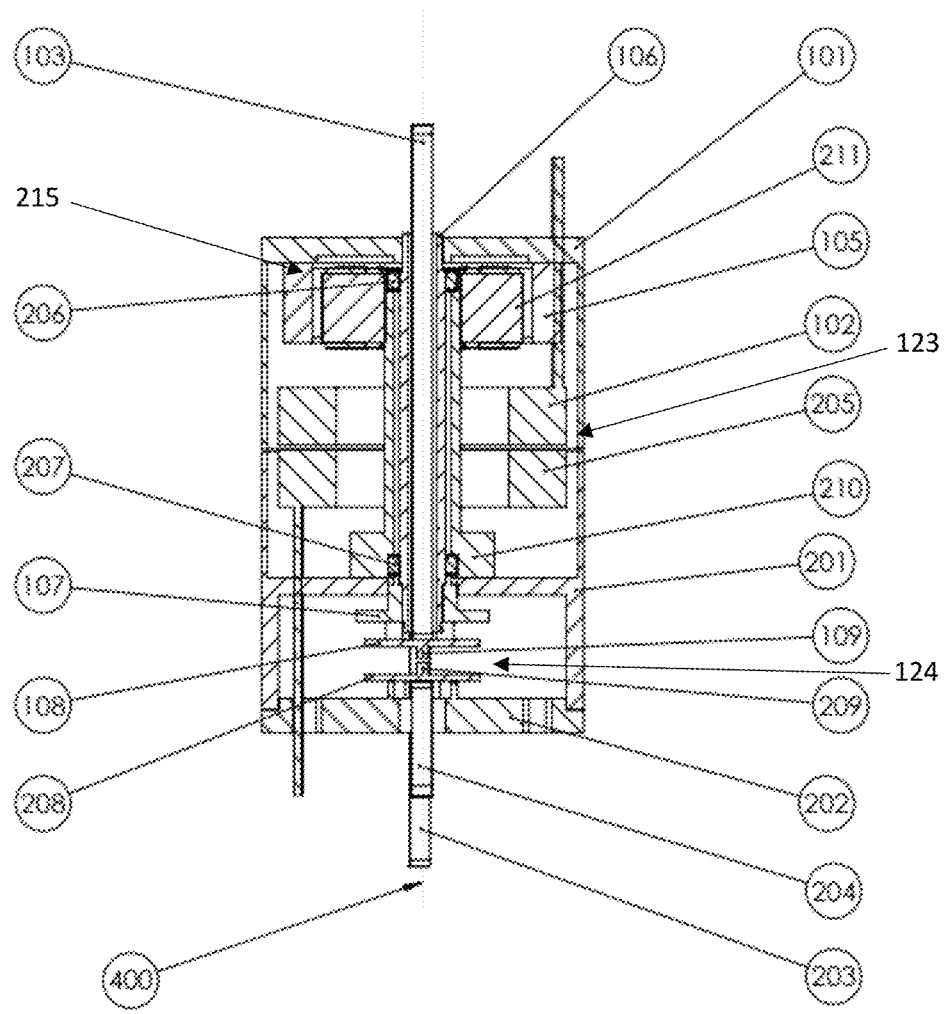
FIG. 3A-3B illustrates internal views of the rotary connector module.
Figure 3B:
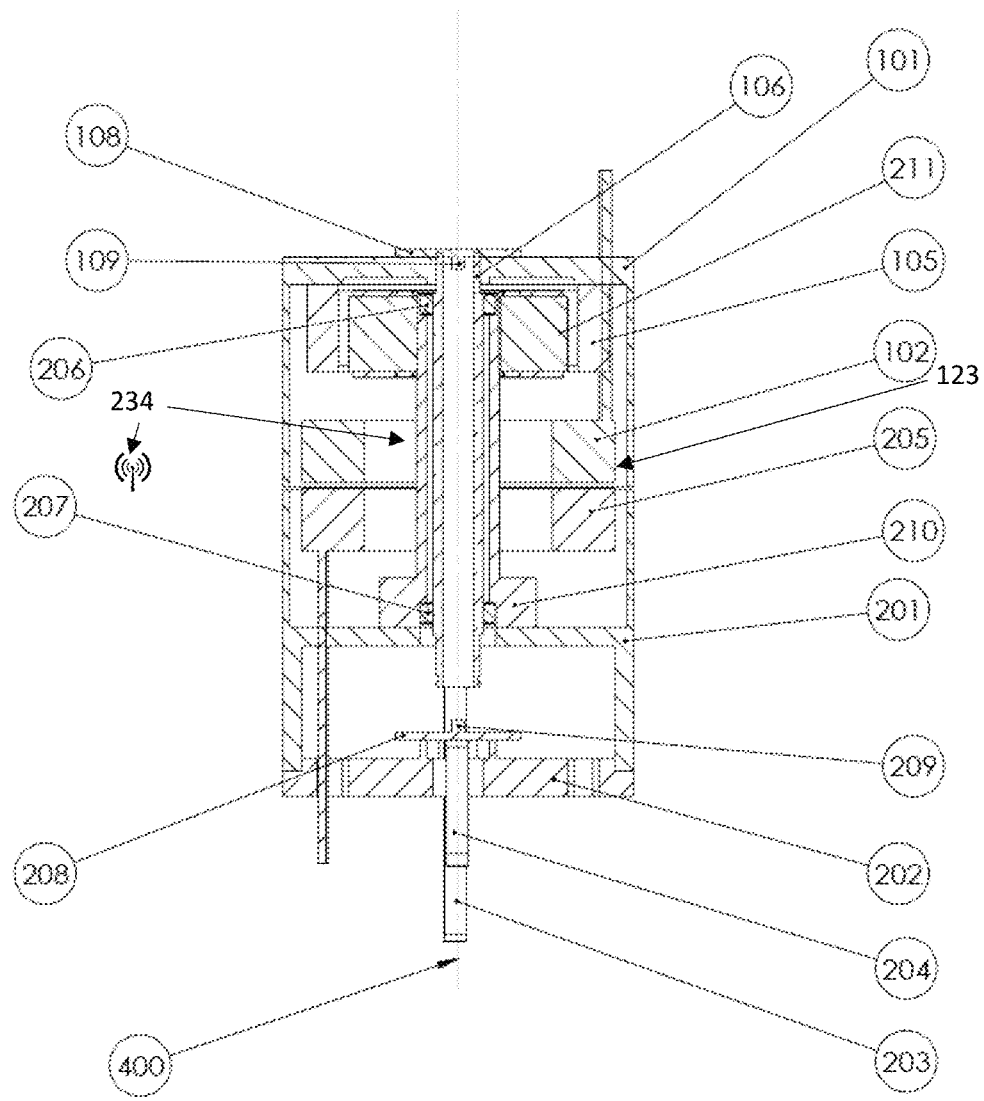

As shown in FIG. 2 and FIG. 3A-3B, the rotary connector module 10 in the illustrated embodiments has the at least one stator part 200 in which the rotation system of the at least one rotor part 100 is disposed, containing a base portion of a stator part 210, in which, at the top and at the base, are a first bearing member 206 and a second bearing member 207. A winding 211 is disposed at the top of the at least one stator part 200. In particular, the inventive concept includes a rotor part connector of wireless power assembly 102 and a stator part connector of wireless power assembly 205. These wireless power assemblies 123, namely the rotor part connector of wireless power assembly 102 and a stator part connector of wireless power assembly 205, contain free space in the center sufficient to pass through the base portion of the stator part 210 when assembling the rotary connector module 10. The wireless power assembly 123, namely the rotor part connector of wireless power assembly 102 and the stator part connector of wireless power assembly 205, can be performed in the form of a secondary and a primary winding, respectively, with the internal diameter of each the rotor part connector of wireless power assembly 102 and the stator part connector of wireless power assembly 205 smaller than the external diameter of an associated magnetic system 105.

The base portion of the stator part 210 is chosen based on the required volume for wireless power elements. The base portion of the stator part 210 is attached to a hull portion of the at least one stator part 201, to which a lid portion of the at least one stator part 202 is attached.

The at least one rotor part 100 of the module 10 is held on the bottom of a hollow shaft 106, which rotates on the first bearing member 206 and second bearing member 207. The at least one rotor part 100 contains a signal receiver 109. The signal receiver 109 is installed preferably on a axis of rotation of the rotor part 400. The rotation system consists of the base portion of the stator part 210, the winding 211, an upper end of the base of the stator part and the magnetic system of the rotary part assembly 105. In this embodiment, the data transmission is preferably a radio transmission and an antenna 234 may be located inside the hollow shaft 106. Also the transmission can be optical transmission.

The rotary connector module 10 contains a wireless data transmission system 124, which consists of a shaft member 106, at least one rotor part 100, at least one signal transmitter 209, and at least one signal receiver 109. The signal receiver 109 is placed at the end of the hollow shaft 106 below the base of the stator part 210 or inside the bottom of the hollow shaft 106.

On an axis of rotation of the rotor part 400 can be a transmitter circuit board member 208 on which at least one signal transmitter 209 can be installed. The at least one signal transmitter 209 may be installed on the lid portion of the at least one stator part 202. The exchange of signals from the transmitter circuit board member 208 can be carried out through a plume member 204 through which the winding control is made.

The emitted optical signal through the at least one signal transmitter 209 through the air medium arrives at the at least one signal receiver 109. The at least one signal receiver 109 and the at least one signal transmitter 209 are preferably disposed on the axis of rotation of the rotor part 400. The at least one signal receiver 109 and the at least one signal transmitter 209 of the wireless data system 124 provides communication through an at least one wireless channel member selected from the group: optical channel, capacitive data transmission, inductive data transmission, and radio frequency communication.

In the wireless data transmission system 124, at least one signal transmitter 209 can be held on the at least one rotor part 100 and on the base portion of the stator part 210. At least one of the at least one signal receiver 109 is nonextended on the rotation axis portion 400 of the at least one rotor part 100. This ensures optical transmission of data through the air environment by containing the optical signal in the enclosed space of the rotary connector module 10 from the at least one rotor part 100 to the at least one stator part 200.

The at least one signal receiver 109 or the at least one signal transmitter 209 or both can also be disposed on the respective receiver circuit board member 108 or transmitter circuit board member 208. To the bottom of the hollow shaft 106 can couple the second bearing member 107 to which the receiver circuit board member 108 is coupled and on which is substantially disposed the at least one receiver of the at least one signal receiver 109. In one example of the rotary connector module 10, the rotary rotation system 215 may contain a winding 211, which is disposed on one of the receiver circuit board member 108 or the transmitter circuit board member 208 along with either or both the at least one receiver of the optical signal 109 or the at least one signal transmitter 209 of the wireless data transmission system 124.

Also, the wireless electrical power transmitting unit 302 can contain a receiver element control member and transmitter element control member 205 designed to implement wireless electrical power transmission from the at least one rotor part 100 that is split on the receiver circuit board member 108 or transmitter circuit board member 208. Either or both the receiver circuit board member 108 and transmitter circuit board member 208 may have a winding 211 of the rotary rotation system 215 and an element control member 205 designed to implement the transmission of wireless power from the at least one stator part 200.

Figure 4A:
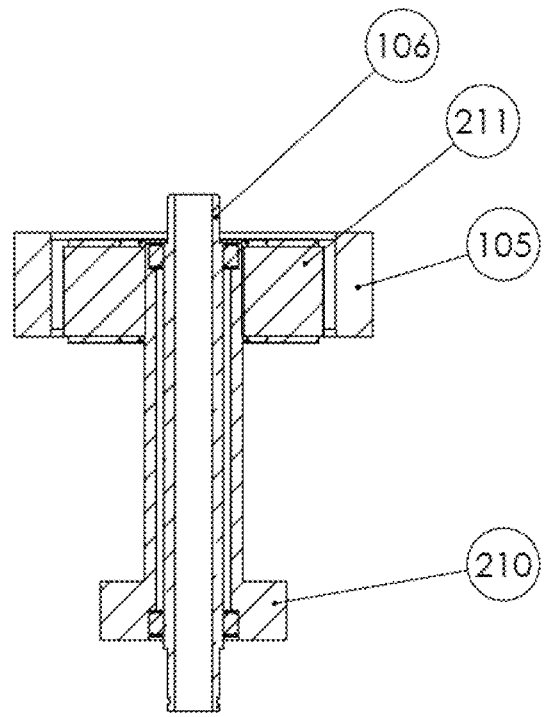
FIG. 4A-4B illustrates the location of the magnetic system.
Figure 4B:
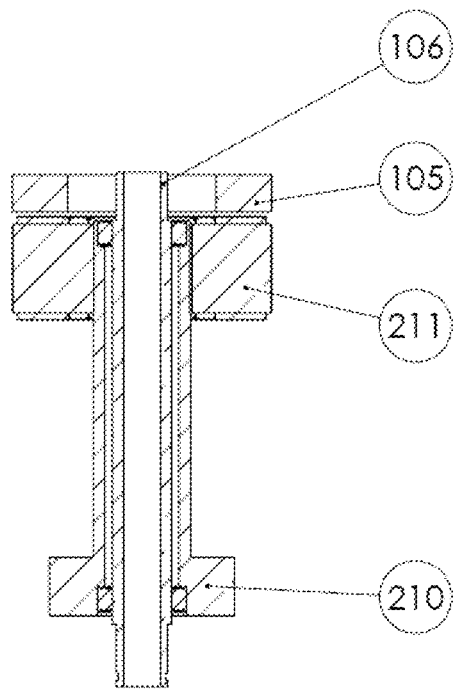

FIG. 4A-4B provides examples of the disposition of the magnetic system 105, which can be disposed both on the outside portion of the winding 211 and above the winding 211.

Figure 5:
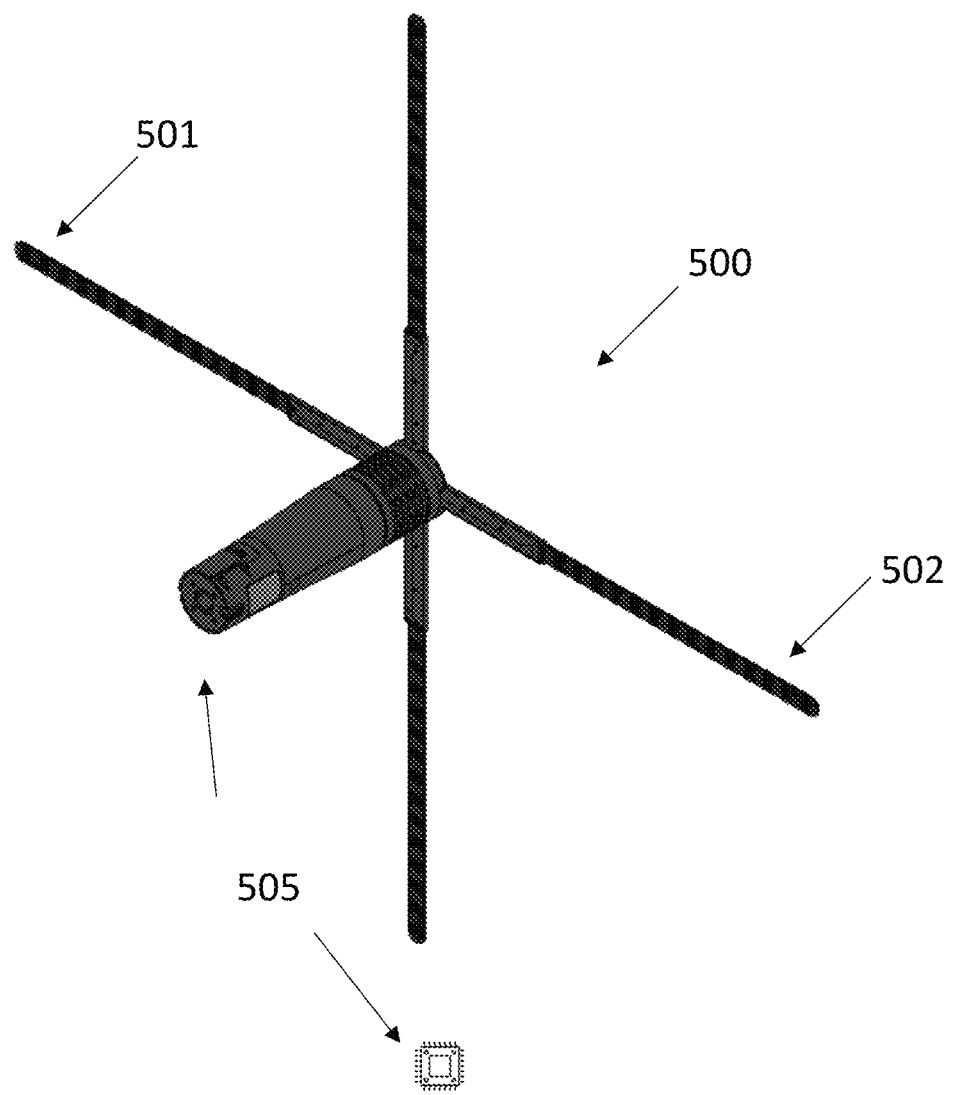
FIG. 5 illustrates an example of a general type of display assembly.

FIG. 5 is an example of a general type of display assembly 500, which proposes the use of the rotary connector module 10. Operations can be performed in the form of an inventive concept that works on the principle of visual inertness, containing at least one blade 501 on which a plurality of LEDs 502 are linearly disposed, and a processor unit that can process images and send the right signals at the right time to each of the light sources so that the device displays one single picture or video. Other types of display devices can be used. A control unit 505 controls designated times and spaces of the LEDs turning on and off.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

What is claimed is:

1. A rotary connector module for a display device comprising:
   a unit for rotation of a rotor part;
   a wireless electrical power transmitting unit for power transmitting from a stator part to the rotor part; and an internal diameter of elements related to the stator or the rotor parts that is less than a diameter of a magnetic system of the rotor part;
   a wireless data transmission unit having a hollow shaft located in the rotor part, at least one signal transmitter located on the stator part, and at least one signal receiver located on the rotor part, wherein the signal receiver is positioned at an end of the hollow shaft below the wireless electrical power transmitting unit.

2. The module according to claim 1, wherein data transmission is selected from: optical transmission, capacitive data transmission, inductive data transmission, radio communication.

3. The module according to claim 1, wherein the unit for rotation of the rotor part comprising a base of the stator part, in which a winding and a magnetic system of the rotor part are located at an upper end of the base of the stator part, and the magnetic system is located on an outside portion of the winding.

4. The module according to claim 1, wherein the unit for rotation of the rotor part comprising a base of the stator part, in which a winding and a magnetic system of the rotor part are located at an upper end of the base of the stator part, and the magnetic system is located above the winding.

5. The module according to claim 1, wherein the receiver and transmitter of the wireless data transmission unit are located on an axis of rotation of the rotor part.

6. The module according to claim 1, further comprising at least one blade attached to the hollow shaft, a plurality of LEDs being attached to the blade.

7. The module according to claim 6, wherein the plurality of LEDs is a linear array of LEDs.

8. The module according to claim 6, further comprising a control unit that controls designated times and spaces of the LEDs turning on and off.

9. The module according to claim 8 being a part of a display forming an image.

10. The module according to claim 8 wherein a rotation frequency exceeds 500 RPM thus adapted to create an image that an observer sees as an image hanging in the air.

11. The module of claim 8, wherein LEDs are RGB types of LEDs, and the image is form by red, green, and blue light of different intensity LEDs.

12. The module according to claim 1, wherein the transmitter is above the unit for rotation of the rotor part.

13. The module according to claim 12, wherein the data transmission is radio transmission and an antenna is located inside the hollow shaft.

14. The module according to claim 12, wherein the data transmission is optical transmission.

15. The module according to claim 1, further comprising a control unit for controlling a power of the wireless transmission.

\* \* \* \* \*